(12) United States Patent
Li et al.

(10) Patent No.: US 10,880,384 B1
(45) Date of Patent: Dec. 29, 2020

(54) MULTI-TASKING RESOURCE MANAGEMENT

(71) Applicant: Amazon Technologies, Inc., Seattle, WA (US)

(72) Inventors: Bo Li, Kenmore, WA (US); Vikram Kumar Gundeti, Bellevue, WA (US); Andrew S. Huntwork, Seatle, WA (US); Shiladitya Roy, Bellevue, WA (US); Rongzhou Shen, Bothell, WA (US); Eswara Jnana Swaroop Bhupathiraju, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/567,010

(22) Filed: Sep. 11, 2019

(51) Int. Cl.
*G06F 3/16* (2006.01)
*H04L 29/08* (2006.01)
*G10L 15/22* (2006.01)
*G10L 15/18* (2013.01)

(52) U.S. Cl.
CPC ........ *H04L 67/142* (2013.01); *G10L 15/1815* (2013.01); *G10L 15/22* (2013.01); *H04L 67/141* (2013.01); *H04L 67/306* (2013.01); *H04L 67/322* (2013.01); *H04L 67/327* (2013.01); *G10L 2015/223* (2013.01)

(58) Field of Classification Search
CPC ..... H04L 67/22; H04L 67/322; H04L 67/141; H04L 67/306; H04L 67/327; G10L 15/22; H04W 4/90; H04W 4/026; H04W 28/26; H04W 72/042
See application file for complete search history.

(56) References Cited

U.S. PATENT DOCUMENTS

| | | | |
|---|---|---|---|
| 7,590,785 B2* | 9/2009 | Joffe | G06F 9/3851 710/200 |
| 2014/0282003 A1* | 9/2014 | Gruber | G06F 3/167 715/727 |
| 2019/0259386 A1* | 8/2019 | Kudurshian | G06F 16/685 |

* cited by examiner

*Primary Examiner* — Chirag R Patel
(74) *Attorney, Agent, or Firm* — Pierce Atwood LLP

(57) ABSTRACT

Described herein is a system for allocating resources among multiple skills to enable multitasking. The system tracks use of resources using skill sessions. In one case, the system suspends a skill session to release a resource for allocation to another resource. In another case, the system determines if multiple skill sessions can remain active and use resources to provide output to the user at the same time.

20 Claims, 13 Drawing Sheets

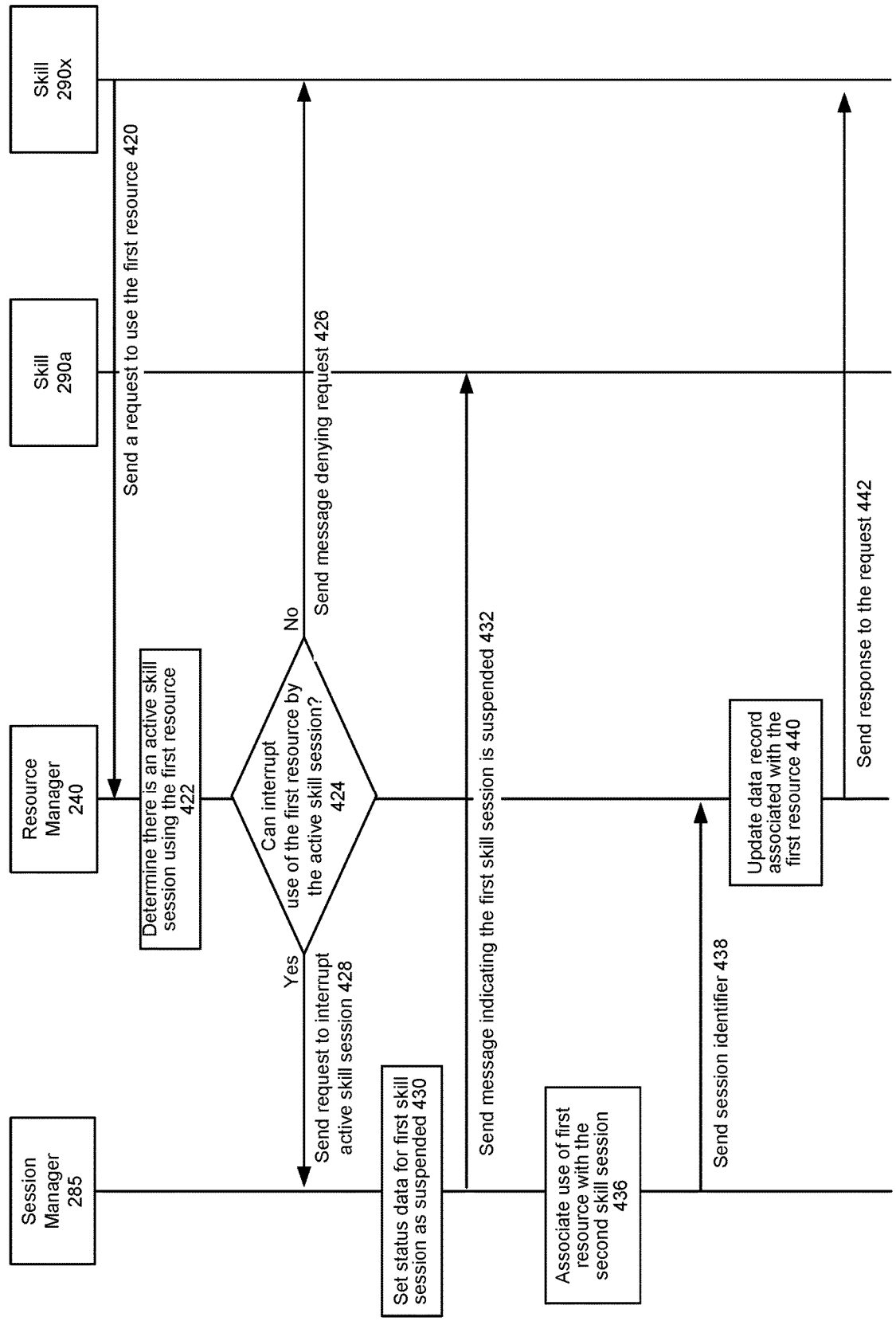

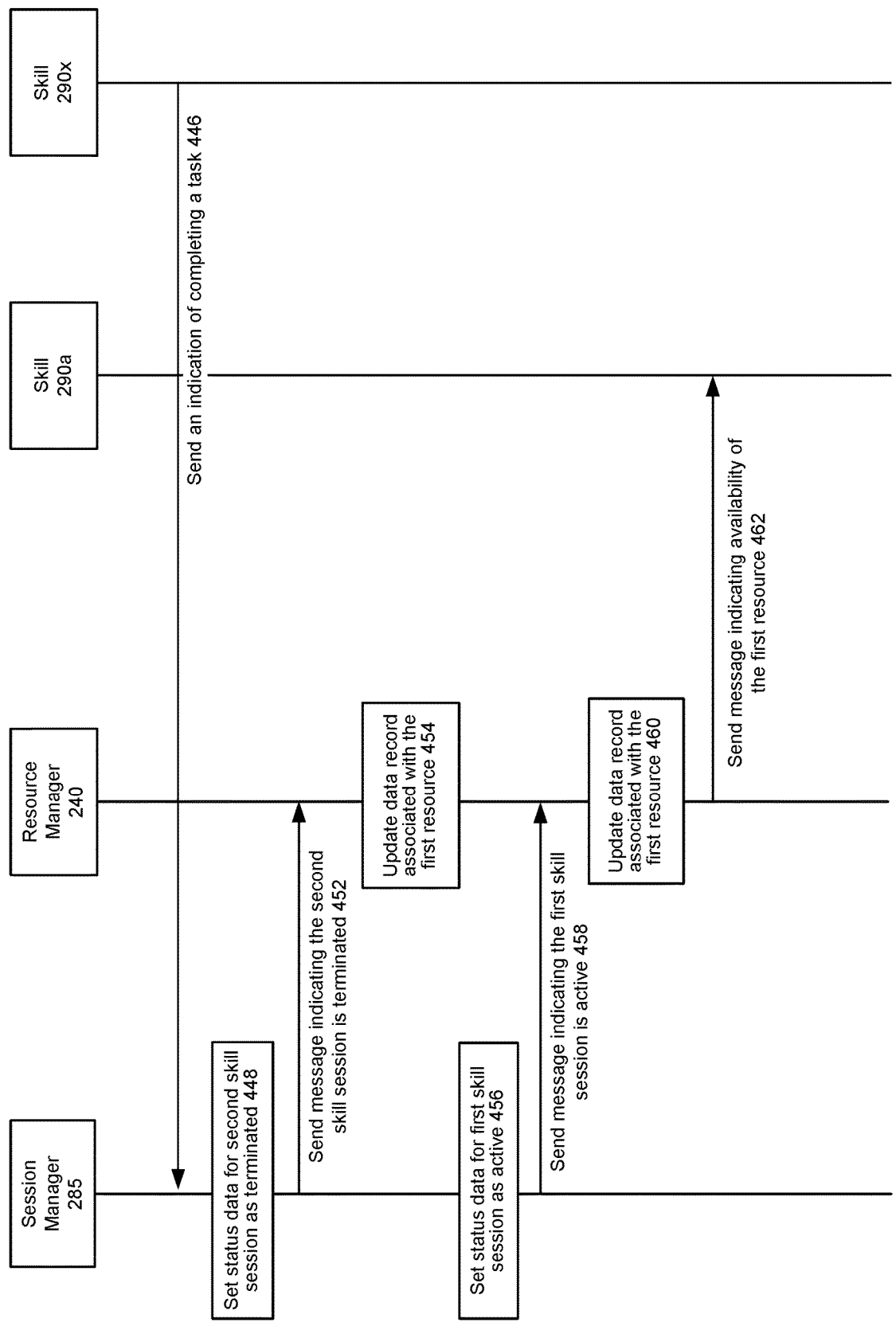

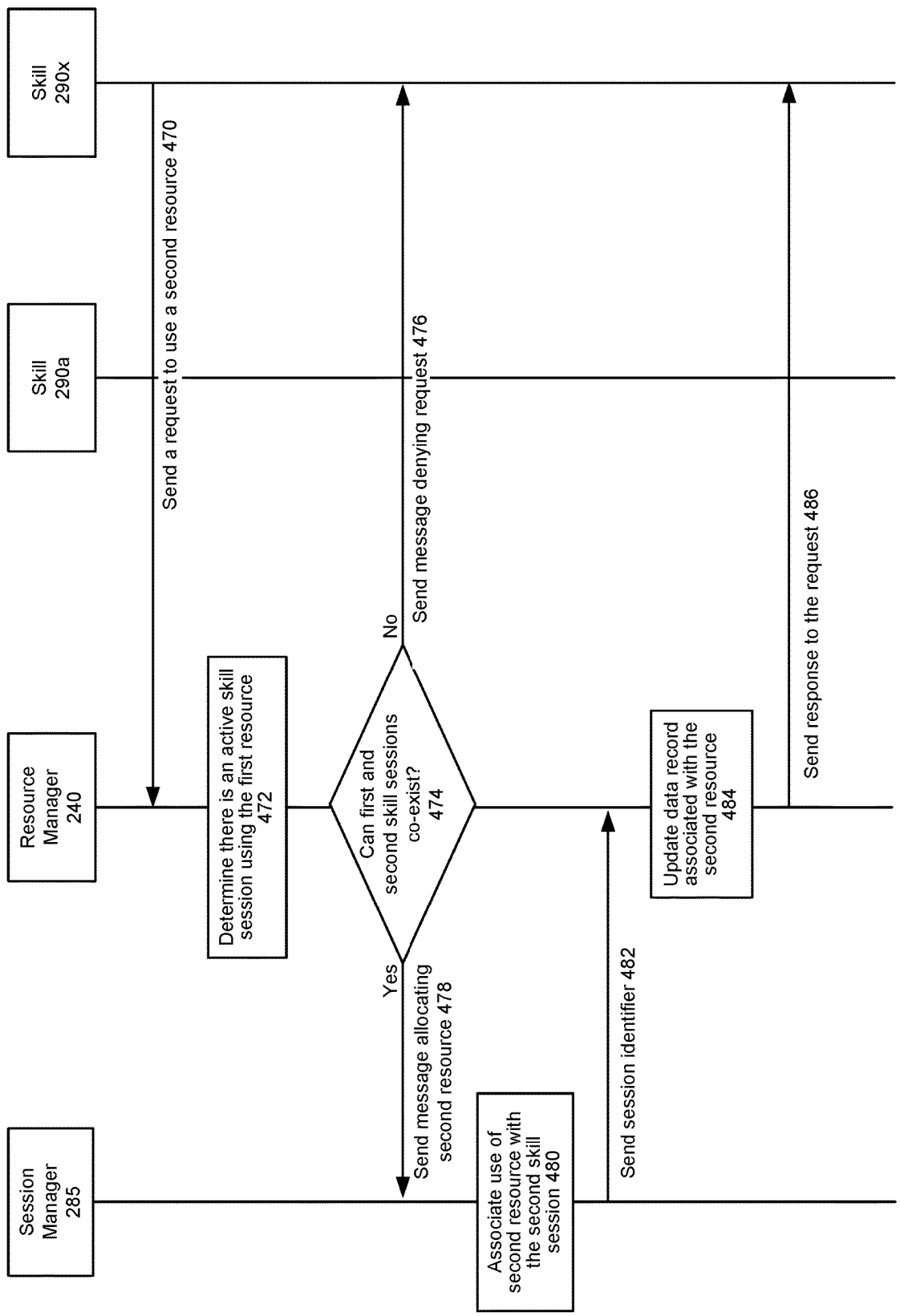

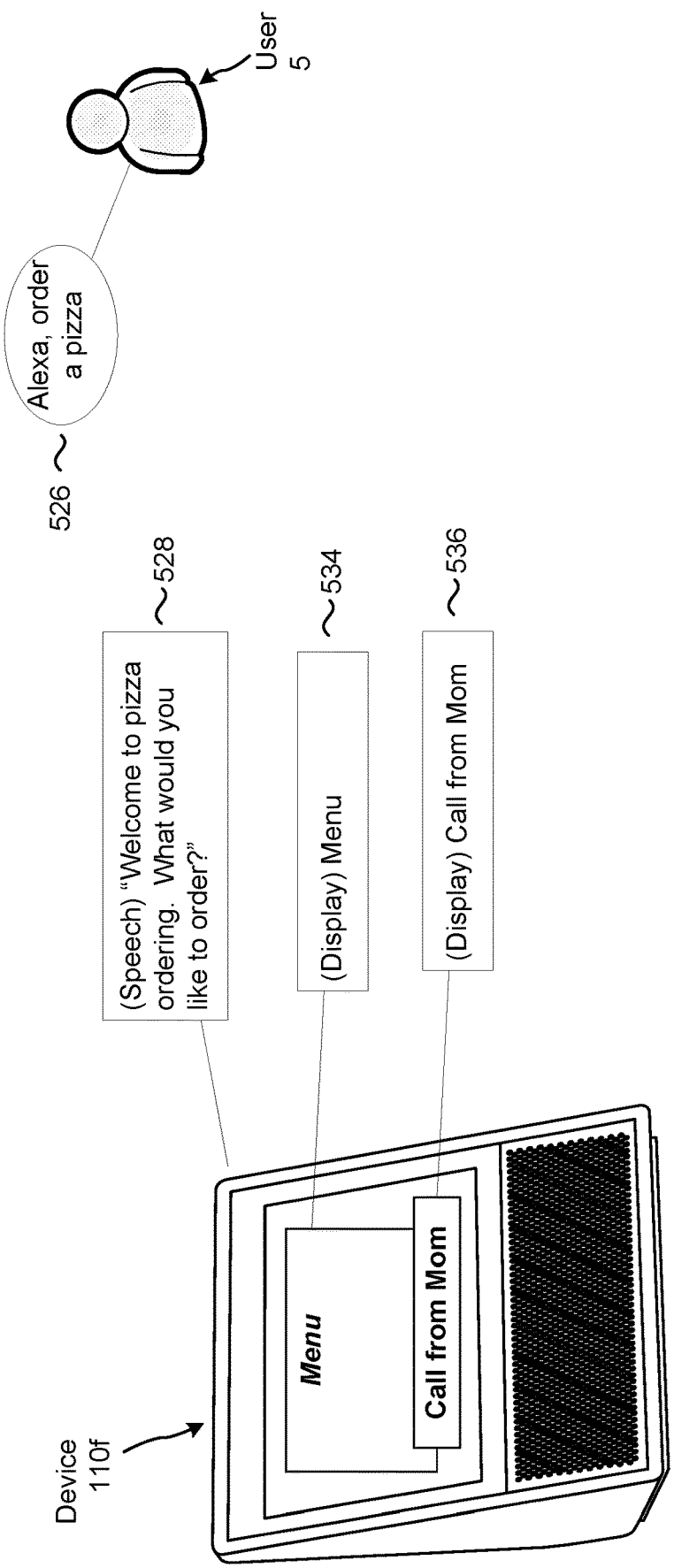

MULTI-TASKING RESOURCE MANAGEMENT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4B is a signal flow diagram illustrating how an additional request to use a resource is processed according to embodiments of the present disclosure.

FIG. 4C is a signal flow diagram illustrating how a resource is reallocated according to embodiments of the present disclosure.

FIG. 4D is a signal flow diagram illustrating how skills can use different resources at the same time according to embodiments of the present disclosure.

FIGS. 5A and 5B illustrate a user interaction with a system according to embodiments of the present disclosure.

DETAILED DESCRIPTION

Figure 1A:
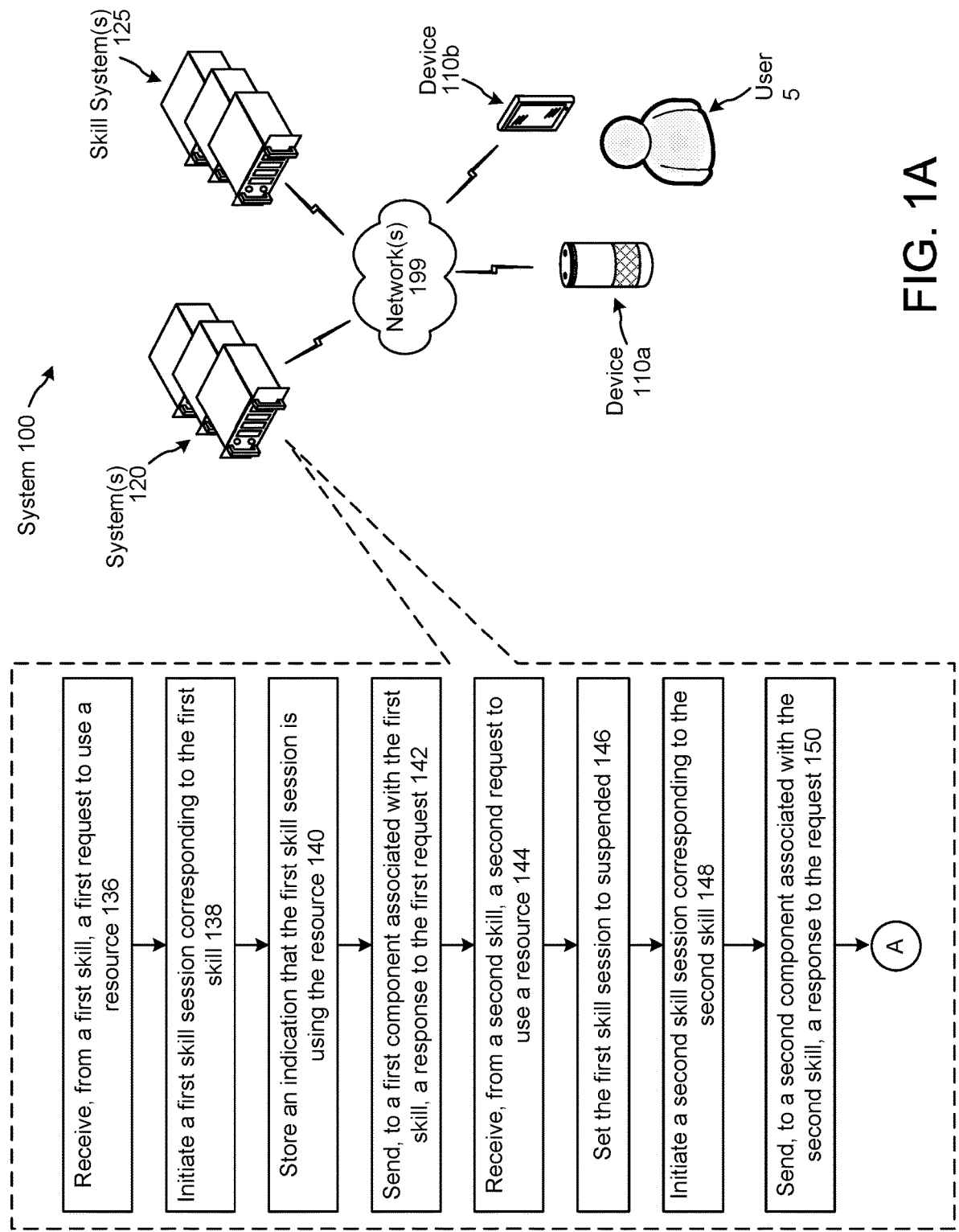
FIGS. 1A and 1B illustrate a system configured to allocate resources among multiple skills according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may include multiple applications and/or other type of skills that are capable of performing particular actions. The system may identify an appropriate skill to perform a particular action. For example, a skill system corresponding to Spotify and a skill system corresponding to Pandora are both capable of playing music. The system may choose one of these skill systems to play music based on various factors.

In a patentable improvement, the system enables multi-tasking by allowing a skill system to interrupt use of a resource by another skill system. For example, while interacting with a game skill, the user may say "what is the time?" and the system may interrupt the use of the device speaker by the game skill, allocate the use of the device speaker to a time skill, and enable the system to respond "it is 11 AM." In further improvements, the system enables multitasking by allowing skill systems to share resources and output content at the same time. For example, the system may enable use of the device speaker by a music playback skill to output audio content, while enabling use of the display screen by a cooking skill to output visual content.

The system described herein enables such multitasking by managing resource allocation using a skill sessions. The system may track the state of a skill session, which may include active, suspended or terminated and may allocate resources accordingly.

As used herein, a skill session refers to an interaction between the user and the system that invokes an application and/or skill. One skill session may correspond to invocation of a single application and/or skill. For example, a skill session may be initiated when an instance of an application and/or skill is invoked and the skill session may be terminated when the interaction with the application and/or skill is completed (upon user request or automatically by the system). In some cases, invoking another instance of the application and/or skill may initiate another skill session.

The system may also determine when a resource can be allocated to another skill session and when skill sessions can provide output at the same time. For example, in a cook-along experience on a device with a display screen both audio and visual content can be manifested. The visual content is constantly being outputted throughout the entire cook-along experience, while at the same time, the audio content from the cook-along experience is occasionally being outputted throughout the experience. While the cook-along experience is not outputting audio content, audio content from another experience such as music playback can be outputted. To achieve this, the system may determine whether use of a resource is requested for the entirety of the skill session (where the resource is occupied for until the skill session is terminated, for example to constantly provide visual content) or a portion of the skill session to perform some task (where the resource is released after the task is performed even if the skill session has not terminated, for example to provide occasional audio content). Being aware of the scope that an experience utilizes the resource can be a signal for the system to coordinate resource usage across experiences, and perform the actions such as interrupting or resuming experiences. The system also enables skills to acquire a resource for an appropriate scope allowing to make appropriate interruptions and enabling multitasking.

The system may also determine whether the priority of use of the resource requires that an experience is not interrupted. For example, a music playback experience may output audio content and optional visual content. Since, the visual content is optional, if a request to use the display resource for another experience is received, the system may allocate the display resource the other experience.

Figure 1B:
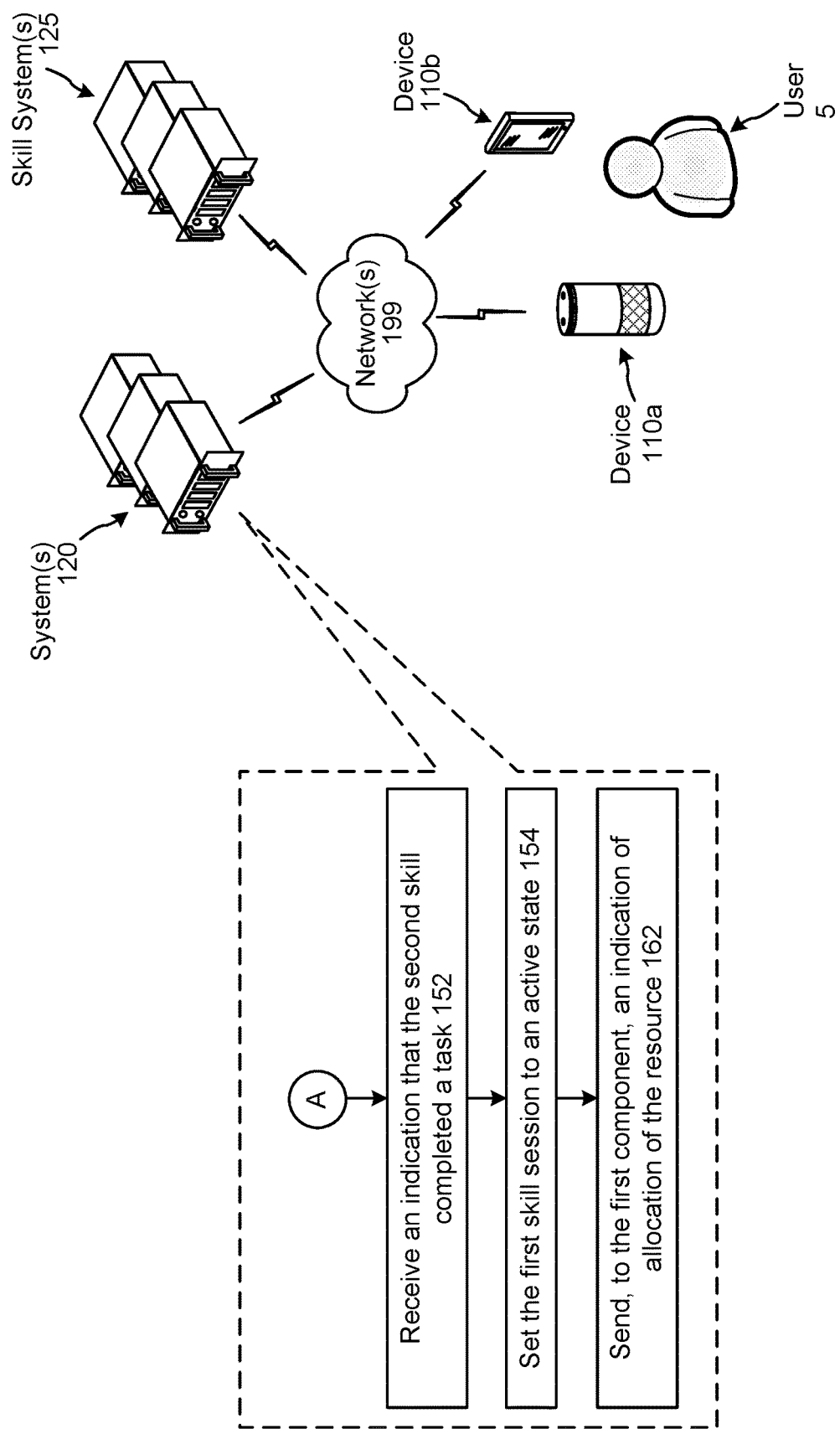

FIGS. 1A and 1B illustrate a system configured to allocate resources to multiple skills according to embodiments of the present disclosure. As illustrated in FIGS. 1A and 1B, the system may include one or more devices (110a/110b) local to a user 5, one or more systems 120, and one or more skill systems 125 connected across one or more networks 199.

Referring to FIG. 1A, the system(s) 120 may receive (136) a first request, from a first skill, to use a resource (e.g., first resource). The first request may be sent by a skill system 125 associated with the first skill. In an example embodiment, the request may be generated in response to the system(s) 120 receiving a user input from the user 5 via the device 110a/110b. The user input may be audio data representing an utterance spoken by the user 5 and captured by the device 110a. Alternatively, the user input may be text data inputted by the user 5 via the device 110b. The system(s) 120 may process the user input to determine an intent and a corresponding skill (e.g., the first skill) to execute the intent. To execute the intent, the first skill may need access to resources, and may send the request to use a resource.

The system(s) 120 may initiate (138) a first skill session corresponding to the first skill. The system(s) 120 may use the first skill session to track use of the resource and to track the beginning and end of the interaction between the user and the first skill. The system(s) 120 may generate a data record to store data corresponding to the first skill session, including a session identifier, a skill identifier, status/state of the session, and other data relating to the skill session. The system(s) 120 may also set the skill session to active by updating the status/state field of the data record to indicate active. The system(s) 120 may also store (140) an indication that the first skill session is using the resource. The system(s) 120 may update a data record associated with the resource to indicate that it is in use by the first skill session.

The system(s) 120 may send (142), to a first component (e.g., skill system 125) associated with the first skill, a response to the first request for the resource. The response may indicate that the resource is allocated to the first skill for the first skill session and may also include the skill session identifier associated with the first skill session.

The system(s) 120 may receive (144) a second request, from a second skill, to use a resource (e.g., a second resource). The second request may be sent by a skill system 125 associated with the second skill. In an example embodiment, the second request may be generated in response to the system(s) 120 receiving an additional user input from the user 5 via the device 110a/110b. The system(s) may process the additional user input to determine a second intent and a corresponding skill (e.g., the second skill) to execute the second intent. To execute the second intent, the second skill may need access to resources, and may send the second request to use a resource. In another embodiment, the second request may be generated in response to the skill system 125 generating output data (e.g., notification data) based on system and skill configurations and user preferences. The second skill may generate the second request to use resources to output the output data.

The system(s) 120 may determine that the resource in use by the first skill session is the same as the second resource requested by the second skill. The system(s) 120 may set (146) the first skill session to a suspended state. The system(s) 120 may do so by updating the status/state field of the data record corresponding to the first skill session to indicate suspended. The system(s) 120 may also store an indication that the use of resource is suspended with respect to the first skill session. The system(s) 120 may send a message to the first component (e.g., skill system 125) associated with the first skill to indicate that the first skill session is suspended and that the resource is no longer available for use by the first skill.

The system(s) 120 may initiate (148) a second skill session corresponding to the second skill. The system(s) 120 may use the second skill session to track use of the resource and to track the beginning and end of the interaction between the user and the second skill. The system(s) 120 may generate a data record to store data corresponding to the second skill session, including a session identifier, a skill identifier, status/state of the session, and other data relating to the skill session. The system(s) 120 may also set the second skill session to active by updating the status/state field of the data record to indicate active. The system(s) 120 may also store an indication that the second skill session is using the resource. The system(s) 120 may update a data record associated with the resource to indicate that it is in use by the second skill session.

The system(s) 120 may send (150), to a second component (e.g., skill system 125) associated with the second skill, a response to the second request for the resource. The response may indicate that the resource is allocated to the second skill for the first skill session and may also include the skill session identifier associated with the second skill session.

Referring to FIG. 1B, the system(s) 120 may receive (152) an indication that the second skill completed a task. The system(s) 120 may receive a message, from the second component, indicating completion of a task(s) and use of the resource. In response, the system(s) 120 may set the second skill session to a terminated state. The system(s) 120 may do so by updating the second status/state field of the second data record corresponding to the second skill session to indicate terminated.

The system(s) 120 may set (154) the first skill session to an active state, enabling the first skill to resume the previous interaction. The system(s) 120 may do so by updating the first status/state field of the first data record corresponding to the first skill session to indicate active. The system(s) 120 may also store an indication that the resource is in use by the first skill session. The system(s) 120 may send (162) an indication, to the first component, that the resource is allocated to the first skill.

In example embodiments, when a skill session is in an active state, the system(s) 120 may route user inputs to the corresponding skill for processing. For example, in a multi-turn interaction with a skill, like a trivia game skill, where the system outputs a question and the user provides an answer, the system(s) 120 route the user inputs/answers to the trivia game skill for processing as long as the corresponding skill session is in an active state. The system(s) 120 may also allow use of requested resources by the skill when the corresponding skill session is in active state.

In example embodiments, when a skill session is in a suspended state, the system(s) 120 may not route user inputs to the corresponding skill for processing. When a skill session is in a terminated state, the system(s) 120 may stop routing user inputs to the corresponding skill. If further user inputs indicate an intent corresponding to that skill, then the system(s) 120 may initiate a new skill session to track the beginning and end of the new interaction. The resources requested by the skill corresponding to the suspended or terminated skill session may be released or available for allocation to another skill.

In an example embodiment, the second resource requested by the second skill may be different than the resource in use by the first skill session. In this case, the system(s) 120 may not place the first skill session in a suspended state. The system(s) 120 may determine whether the first skill and the second skill can provide an experience or output to the user at the same time, and may keep the first skill session in an active state and initiate a second skill session in an active state to enable both skills to provide an output to the user (where the first skill uses the first resource and the second skill uses the second resource).

Figure 2:
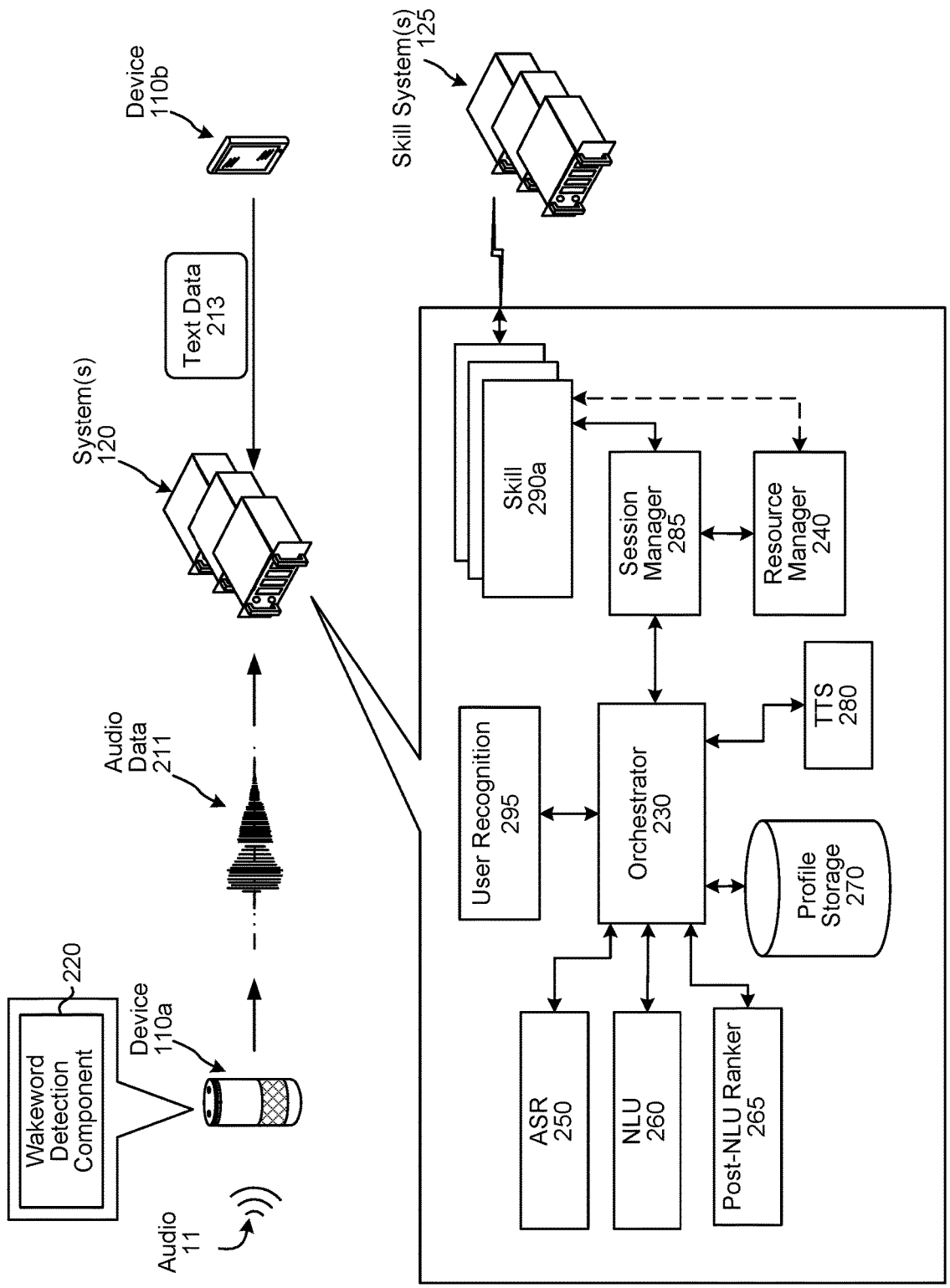
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the system(s) 120. The audio data 211 may include data corresponding to the wakeword, or the device 110*a* may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 213 representing the text-based user input. The device 110*a* may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to skill component may include a skill 290 operated by the system(s) 120 and/or skill operated by the skill system(s) 125. Moreover, the functionality described herein as a skill may be referred to using many different terms, such as an action, bot, app, or the like. A skill component may be software on a user device (e.g., device 110), software on a remote device (e.g., skill system 125), a combination of software on a user device and a remote device, a system including multiple components (e.g., a smart home system), one component of a multi-component system, and the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 3:
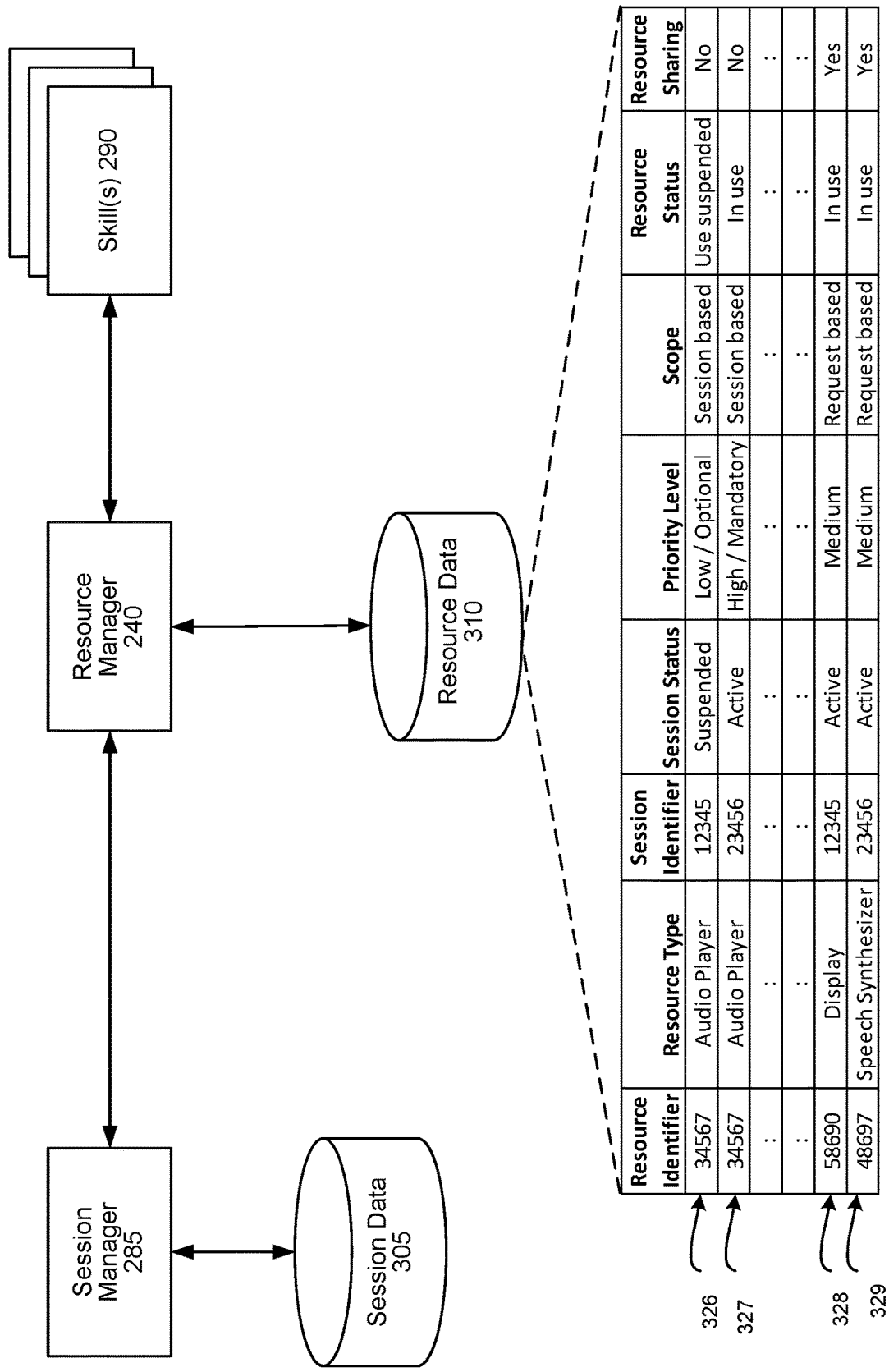
FIG. 3 is a conceptual diagram illustrating components that a system may use to process a request to use a resource according to embodiments of the present disclosure.

The system(s) 120 may include a links action manager component 295, operations of which are described further in connection with FIG. 3. The links action manager component 295 may facilitate determining which skills are registered to perform an action, validate payload data received from a skill to determine whether the action can be performed by another skill, and facilitate other functionalities described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may include a session manager component 285. The session manager component 285 may be configured to schedule the execution of requests and tracking the progress of a corresponding skill session. The session manager component 285 may consist of persistent storage for all skill sessions, their state, the relationship between sessions and the devices. The session manager 285 may also facilitate tracking of resource usage.

The system(s) 120 may also include a resource manager component 240. In some embodiments, the resource manager component 240 may be implemented as part of the session manager component 285 depending on system configuration. The resource manager component 240 may be configured to process requests for using resources, manage and track usage of resources, and determine whether usage of a resource can be interrupted by another skill/experience. Resource usage may be attached to skill sessions to track which skill session requests which resource and which skill session is actively using a resource. The resource manager component 240 may also determine whether a resource can be shared between skills/experiences. The resource manager 240 may also determine if a skill/experience can use a resource while another skill/experience is using another resource and both can provide some output to the user at the same time. In some embodiments, the skill(s) 290 may send requests to the resource manager 240 for resource usage. In other embodiments, the skill(s) 290 may send requests to the session manager 285 for resource usage, the session manager 285 may route the requests to the resource manager 240 for processing.

The orchestrator 230 may receive a user input in the form of audio data 211. The ASR component 250 may process the user input as described in connection with FIG. 2, and may forward the results (one or more ASR hypothesis) to the orchestrator 230.

In some embodiments, the NLU component 260 may be configured to support intents that allow a user to pause or interrupt an on-going skill and later resume the skill. For example, the NLU component 260 may be configured to support a PauseIntent, which may be determined as applicable to utterances that include the word "pause" and the skill name (e.g., "pause trivia") or that include just the word "pause" or other synonyms. The NLU component 260 may further be configured to support a ResumeIntent, which may be determined as applicable to utterances that include the word "resume" and the skill name (e.g., "resume trivia") or that include just the word "resume" or other synonyms. The NLU component 260 may also determine that the PauseIntent is applicable when the intent associated with the user input corresponds to a skill different than the on-going skill. In other embodiments, the system(s) 120/system 100 may determine that the on-going skill needs to be interrupted based on the NLU component 260 generating a N-best list that includes at least one NLU hypothesis corresponding to a skill different than the on-going skill. That is, a different skill needs to be invoked to fulfill the user request/intent.

In a non-limiting example, when a user asks for the time while the trivia skill is active, the NLU component 260 may output the following N-best list:
NLU hypothesis 1: intent="AnswerQuestionIntent"; confidenceScores="MEDIUM"; tokens=<_>, slot=<_>
NLU hypothesis 2: intent="WhatTimeIntent"; confidenceScores="HIGH"; tokens=<_>, slot=<_>

FIG. 3 is a conceptual diagram illustrating components that the system 100 may use to process a request to use a resource according to embodiments of the present disclosure. The system 100 may include the session manager 285, the resource manager 240, and the skill(s) component 290. The components 285 and 240 may be implemented as part of the system(s) 120 or may be implemented outside of the system(s) 120 depending on the system configuration.

The session manager component 285 may be configured to schedule the execution of skill requests and tracking the progress of the corresponding skill session. The session manager component 285 may consist of persistent storage in session data storage 305 for all sessions, their state, the relationship between sessions and the users, devices, and other resources associated with each session. For example, the session data storage 305 may store data records, each including a session identifier (to identify a skill session where a user is interacting with a skill), a skill identifier (to identify the skill the user is interacting with), status (e.g., active, suspended or terminated) and other data (e.g., whether a session can be resumed, duration time for resuming a session, etc.) The session manager component 285 may also track a relationship or other attributes between a first skill session and a second skill session. For example, the session manager component 285 may track a temporal relationship between the first and second skill session indicating that the first skill session/first skill was invoked before the second skill session/second skill. The session manager component 285 may also track that the first skill session/first skill was interrupted by the second skill session/second skill. That is, the second session/second skill was invoked while the first session/first skill was active.

The session manager component 285 may be configured to process a signal or message and determine the state of a skill session. For example, the session manager component 285 may receive a request to use a resource (forwarded by the resource manager 240) by a skill 290. The session manager component 285 may initiate a skill session and associate the use of the resource with the skill session. The session manager component 285 may also receive a request to interrupt an active skill session in response to another skill requesting use of a resource. The session manager component 285 may place the active skill session in a suspended state, initiate another skill session and associate use of the requested resource with the new skill session. Once a task is completed by the interrupting skill, the session manager 285 may place the corresponding skill session in a terminated state, place the previous skill session in an active state, and inform the resource manager 240 and the corresponding skill 290 that the corresponding skill session can be resumed. Further details on how the session manager component 285 processes requests for using resources are provided in connection with FIGS. 4A-4C.

In some embodiments, the session manager component 285 may receive a message from the orchestrator 230 to pause the current skill session and/or to invoke another skill, and the session manager component 285 may determine to place the current skill session in a suspended state and/or initiate a new skill session corresponding to another skill. The session manager component 285 may receive a message from a skill indicating that it has completed its task, and may determine to place the corresponding skill session in a terminated state. In response to that skill session being in a terminated state, the session manager component 285 may determine that there is another skill session in a suspended state that can be placed in an active state, and may cause the previous skill session to resume.

In some embodiments, the session manager component 285 may be configured to manage the various states of a skill session. The states of the session may include active, terminated and suspended. While a session is in the active state, there may be two ways to suspend the session. One is when a switch in skill/experience is needed to respond to a user request. For example, while interacting with a game skill, the user may say "what time is it?" and the system 100 may determine that another skill (not the currently active game skill) needs to be invoked to respond to the user's request. The other way to suspend the session is when the user explicitly requests to pause the session. For example, while interacting with the game skill, the user may say "Alexa, pause the game," and the system 100 determines, in response, that the session corresponding to the game skill needs to be suspended. In both cases, the system 100 executes a request to suspend session. The system 100 may send a message to the skill (e.g., a skill system 125 associated with the active skill) indicating that there is request to suspend the session corresponding to the skill, and the skill may respond with a message indicating whether the skill is capable of being suspended. The message from the skill may also include a duration of time within which the skill can be resumed.

The system 100 determines if the session can be resumed based on the message received from the skill and/or other data available to the system 100. If the session cannot be resumed, then the session is placed in the terminated state. If the session can be resumed, then the session is placed in the suspended state.

From the suspended state, the session may move back to the active state in two ways. One is when the skill/experience that interrupted the session has ended. For example, the interrupting skill/experience may end when the system 100 has caused the device 110 to output the time in response to the user request "what is time is it?" The system associated with the interrupting skill/experience may send a message to the system 100 indicating that it has provided its output and that the corresponding session can be terminated. The other way the session may move back to the active state is when the system 100 receives an explicit request from the user to resume the session. For example, the user may say "Alexa, resume the game," and the system 100, in response, places the session in the active state. In both cases, the system 100 executes a request to resume the session causing the session to be placed in the active state, and the user can continue interacting with the skill corresponding to the session. The system 100 may send a message to the skill indicating the request to resume the session.

If the session has been suspended for too long, such that the suspension exceeds the maximum duration that the skill specified it can be resumed within, then the session is moved to the terminated state and is not be resumed.

The resource manager component 240 may be configured to process requests for using resources, and these requests may be received from one or more skills 290 (or the corresponding skill system(s) 125). The resource manager component 240 may determine if a request to use a resource can be granted, that is, whether the requested resource can be allocated to the skill 290. As part of the process for allocating the resource, the resource manager component 240 may instruct/request the session manger component 285 to initiate a skill session to track a beginning and an end of an interaction between the user/device 110 and the skill 290 and to also track usage of the requested resource.

As used herein, a resource may refer to a software or hardware component that can be used to provide an output to a user and/or receive an input from a user. A non-limiting example of a hardware resource is a display screen 616 of the device 110. Other components of the device 110 described in connection with FIG. 6 may also be considered as hardware resources, such an audio output component (e.g., speaker 612), an image input component (e.g., camera 618), an audio input component (e.g., microphone 620), and the like. A non-limiting example of a software resource is the software component that enables volume control, enables audio playback, etc. In some embodiments, a resource may be a capability interface that can be used by systems (e.g., skill system(s) 125) external to the system(s) 120/device 110 to provide an output to the user. Such capability interfaces may include, but are not limited to, an audio player interface, a video interface, a speech synthesizer interface, a notifications interface, a media player interface, and the like.

In example embodiments, the request to use a resource may include a type of resource requested, a priority level for using the resource, a scope for using the resource, and other data. The type of resource may indicate which resource the skill wants to use, for example, audio player or display.

The priority level for using the resource may indicate how important the use of the resource is with respect to the experience the skill is providing. Use of all the requested resources may not always be required for an experience. In a non-limiting example, as a part of a music playback skill, there may be visual content to present to the customer, but if the display resource is in use (occupied) by a cook-along skill to display a recipe, then the system 100 may not enable the music playback experience to use the display. However, the system 100 may enable the music playback skill to use the audio player or speaker resource to output audio, while the cook-along skill outputs visual content via the display resource. Such usage of resources by multiple skills may be determined based on the priority level indicated by the skill.

In example embodiments, the priority level may be represented as the following levels: low, medium or high. In other embodiments, the priority level may be represented as the following levels: none, support or mandatory. The low/none level may indicate that the experience being provided by the skill does not depend of the use of the resource. The medium/support level may indicate that use of the resource supports an enhancement to the core experience, so the core experience can exist without access to the resource. The high/mandatory level may indicate that the use of the resource is part of the core experience, and the experience cannot exist without this resource. Continuing with the example above related to the music playback skill and the cook-along skill, the request for use of resource from the music playback skill may indicate that the use of the display resource has a priority level of medium or support.

The scope for using the resource may indicate one of two scopes: session scope or request scope. The scope may indicate the duration for which the skill wants to use the resource. The session scope may indicate that the skill wants to reserve the resource for the lifecycle of the skill session. The lifecycle of the skill session may refer to the duration of time from when the skill session is active to when the skill session is terminated, that is, from the beginning of the interaction between the skill and the user till the end of the interaction. When a skill requests a resource under the session scope, the system 100 may allocate the resource to the skill for continuous use. For example, a skill may request use of the audio output component under the session scope for continuous audio output or long-form audio output, such as playing music or reading a book. The request scope may indicate that the skill wants to use the resource for a portion of the lifecycle of the skill session to perform a particular task and/or for a particular time duration, and the resource will be released (that is, the use of the resource will be terminated) after the use of the resource is no longer needed. In the request scope, the resource may not be used/occupied by the skill for the entire skill session. In a non-limiting example, a skill may indicate the scope for using a speech synthesizer resource as 'request scope,' in which case as soon as the text-to-speech (TTS) audio content is rendered, the speech synthesizer resource may be released and can be allocated to other skills. The request scope may also be used by a skill to indicate intermittent or non-continuous use of a resource. Being aware of the scope that a skill utilizes the resource for can be a signal for the system 100 to coordinate resource usage across skills, and perform the actions such as interrupting or resuming skill sessions. The system 100 also enables skills to acquire a resource for an appropriate scope allowing to make appropriate interruptions and enabling multitasking.

In a non-limiting example, a workout skill may be providing a 7-minute workout experience to a user by playing music content using the audio player resource and also by intermittently playing speech content using the speech synthesizer resource. While the skill session corresponding to the workout skill is active, a request to use a resource from another skill may be received by the resource manager 240. To illustrate how the system 100 may process requests indicating a session scope or a request scope, a few exemplary cases are described.

In the case where the request from the workout skill indicated that the use of the speech synthesizer is a session scope, and the request from another skill requested use of the speech synthesizer in a session scope, then the skill session corresponding to the workout skill may be suspended to release the speech synthesizer resource. The content provided by the audio player resource and the speech synthesizer with respect to the workout skill may be interrupted, and the other skill may use the speech synthesizer resource.

In the case where the request from the workout skill indicated that the use of the speech synthesizer is a request scope, and the request from another skill requested use of the speech synthesizer in a request scope, then the skill session corresponding to the workout skill may not be suspended. The workout skill may continue use of the audio player, while the other skill uses the speech synthesizer.

In some embodiments, the request to use a resource may also indicate whether the resource can be shared with other skills. The request may include an indication (e.g., yes or no) representing whether the resource can be shared. The resource manager component 240 may store data indicating how particular resources can be shared. For example, the audio player resource may output audio content from multiple skills by attenuating audio output corresponding to one skill and outputting audio content from another skill simultaneously. The request from a first skill to use the audio player resource may indicate yes for resource sharing, and the request from a second skill (interrupting skill) to use the audio player resource may indicate yes for resource sharing, in which case the system 100 may allow both skills to use the audio player resource. The audio output corresponding to the first skill may be attenuated, while the audio output corresponding to the second skill is played.

In another example, the request from the first skill may indicate that it cannot share the audio player resource. In this case, the system 100 may deny a request from the second skill to use the audio player resource, or the system 100 may suspend the skill session corresponding to the first skill to release the audio player resource and allocate it to the second skill.

In a request to use the display resource, the first skill may indicate that it can share the resource, and a request for the display resource from the second skill may indicate that it can share the resource. In this case, the system 100 may minimize the visual content (e.g., minimize a window displaying the content, reduce the size of a window displaying the content, placing a window displaying the content in a background mode, etc.) corresponding to the first skill, and display content corresponding to the second skill (e.g., replace the content on the display, overlay the content over the first skill's content, etc.).

If the request from the first skill indicates it cannot share the display resource and/or the request from the second skill indicates that it cannot share the display resource, then the system 100 may suspend the skill session corresponding to the first skill to release the display resource and allocate it to the second skill.

In some embodiments, a skill 290 may specify how it wants to use the resource, for example, the priority level and scope, at the time of requesting the use of the resource. In other embodiments, a skill 290 may specify how it wants to use a particular resource when the skill 290 is configured to operate with the system(s) 120 to provide an experience to a user via the device 110. The data provided by the skill 290 may be stored in the resource data storage 310. In yet other embodiments, the resource manager component 240 may specify how a resource can be used by a skill 290a. For example, the resource manager component 240 may specify whether the audio player resource or the display player resource can be shared by multiple skills. The resource manager component 240 may specify a priority level for using a resource based on the resource type, system configurations, user preferences stored in profile storage 270, type of content provided by the skill, and other factors. The resource manager component 240 may also specify the scope for using the resource based on the resource type, system configurations, type of content provided by the skill, and other factors.

The resource data storage 310 may store data corresponding to resources associated with the system(s) 120 and/or the device 110. As illustrated, the resource data storage 310 may store data records 326-329, each including a resource identifier (identifying a resource), a resource type (e.g., a name describing the resource), a skill session identifier (identifying a skill session that the resource is allocated to), a skill session status (active, suspended or terminated), a priority level for using the resource (low, medium or high), a scope for using the resource (session or request), a resource status (in use, use suspended or use terminated), and an indication of whether the resource can be shared by the corresponding skill session. The resource data storage 310 may also store other data that may be used to determine resource allocation among multiple skills 290. The resource identifier may also be used to identify a device (e.g., device 110) that the resource is associated with. In other embodiments, the resource data 310 may include a device identifier to identify which device a resource is associated with. The resource status may also indicate why the use of the resource is suspended, for example, that the resource was allocated to another skill session (e.g., session ID 23456).

The data records 326, 327 may represent the state of the resource data 310 at a first time, and the data records 328, 329 may represent the state of the resource data 310 at a second time different than the first time. As illustrated in FIG. 3, in some embodiments, more than one skill session may be active, for example session ID 12345 of data record 328 and session ID 23456 of data record 329. In this case, the two skill sessions are using different resources and the system(s) 120 may have determined that the corresponding skills can provide an output and/or use the different resources at the same time, simultaneously, or substantially at the same time/simultaneously.

A skill may request use of more than one resource for a skill session to provide an experience to the user. For example, a cooking skill may output visual content and audio content, and may request use of the display screen and the speaker of the user's device. In some embodiments, the skill may send separate requests for each resource needed, including data specifying the scope, priority level and ability to share for each resource. In a non-limiting example, the cooking skill may send a first request for the display screen indicating the priority level is high, the scope is session scope, and that the resource can be shared. The cooking skill may send a second request for the speaker indicating the priority level is low, the scope is session scope, and that the resource can be shared.

Figure 4A:
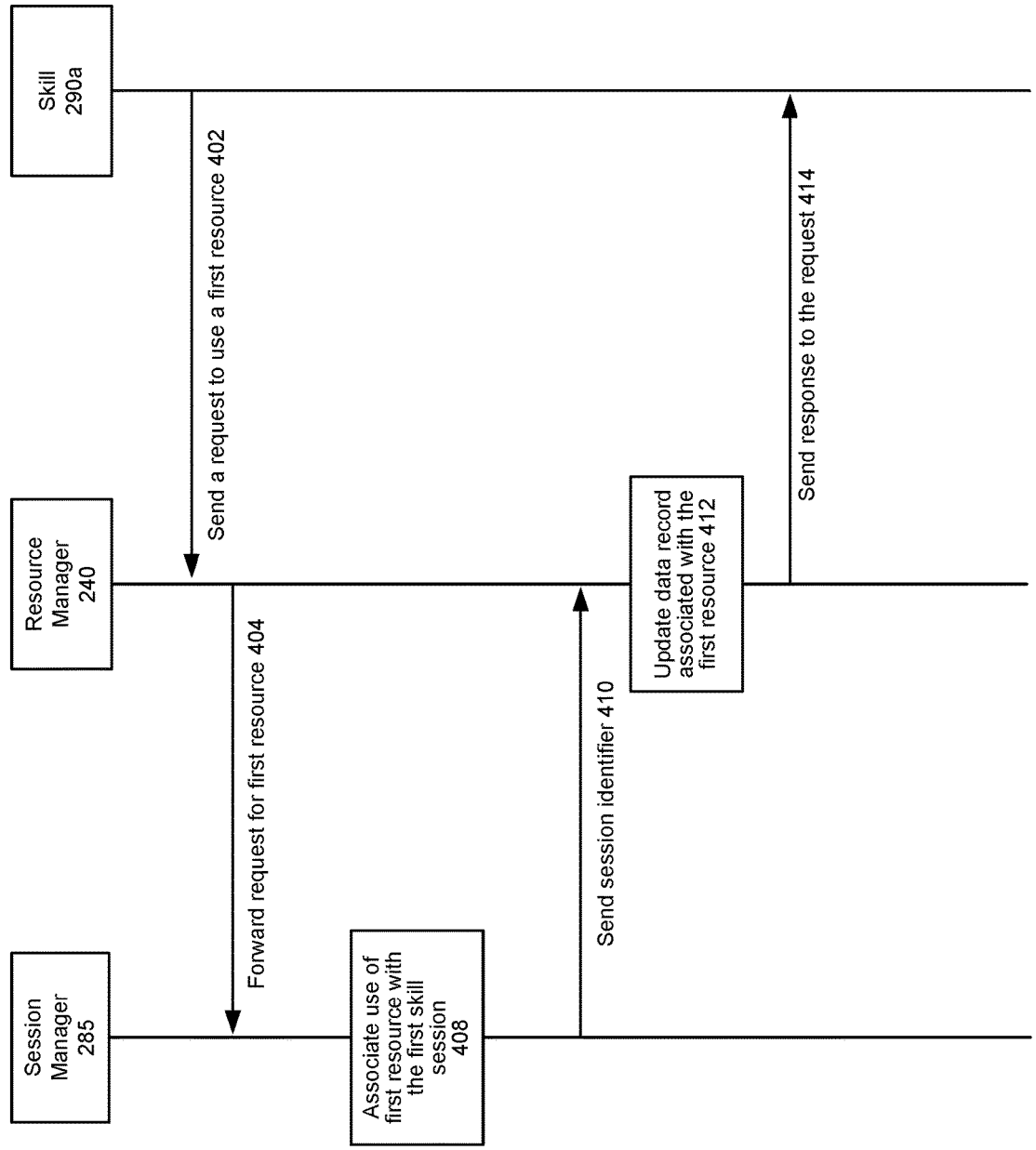
FIG. 4A is a signal flow diagram illustrating how a request to use a resource is processed according to embodiments of the present disclosure.

FIG. 4A is a signal flow diagram illustrating how a request to use a resource is processed according to embodiments of the present disclosure. A skill 290a (or corresponding skill system 125a) may send (402) a request to use a first resource to the resource manager component 240. The request may indicate the resource type, a priority level for using the first resource, and a scope for using the first resource. The request may also indicate whether the first resource can be shared. In other embodiments, the resource manager component 240 may specify the priority level, the scope of use, and/or whether the first resource can be shared based on the skill 290a requesting the first resource and/or the type of resource requested.

The resource manager component 240 may forward (404) the request for a first resource to the session manager component 285. The session manager component 285 may associate (408) the use of the first resource with a first skill session corresponding to the skill 290a by associating a resource identifier or resource type to the data record corresponding to the first skill session. The session manager component 285 may send (410) the first skill session identifier to the resource manager component 240.

The session manager component 285 may have initiated a first skill session to track the beginning and the end of the interaction between the user and the skill 290a. In some embodiments, the session manager component 285 may store a data record in the session data storage 305 including a first skill session identifier, a first skill identifier (e.g., a name, an alphanumeric identifier, or other kind of identifier identifying the skill 290a), and skill session status data. The session manager component 285 may set the skill session status data as active to indicate that the skill session corresponding to the skill 290a is active.

The resource manager component 240 may update (412) a data record associated with the first resource in the resource data storage 310 to indicate that the first resource is in use by the first skill session. The resource manager component 240 may associate the first skill session identifier with the data record corresponding to the first resource. The resource manager component 240 may also set the resource status as 'in use' and store other data provided in the request (from step 402). The resource manager component 240 may send (414) a response to the request to the skill 290a. The response may include the first skill session identifier and an indication that the requested first resource is allocated to the skill 290*a*.

FIG. 4B is a signal flow diagram illustrating how an additional request to use a resource is processed according to embodiments of the present disclosure. The skill 290*x* may send (420) a request to use the first resource to the resource manager component 240. The request may indicate the resource type, a priority level for using the first resource, and a scope for using the first resource. The request may also indicate whether the first resource can be shared. In other embodiments, the resource manager component 240 may specify the priority level, the scope of use, and/or whether the first resource can be shared based on the skill 290*x* requesting the first resource and/or the type of resource requested.

The resource manager component 240 may determine (422) that there is an active skill session using the first resource. The resource manager component 240 may determine, using the resource data storage 310, that the first skill session is active and using the first resource. The resource manager component 240 may then determine (424) whether the use of the first resource by the first skill session can be interrupted. The resource manager component 240 may make this determination based on the first resource in use being the same as the resource that is requested. If the requested resource is in use by the first skill session that is active, then the resource manager component 240 may determine if the first skill session requested use of the resource for session scope. Then the resource manager component 240 may determine if the first skill session indicated a low priority for using the first resource. Based on these factors, the resource manager component 240 may determine if the first skill session can be interrupted.

If the first skill session cannot be interrupted, then the resource manager component 240 may send (426) a message to the skill 290*x* denying the request to use the first resource. If the first skill session can be interrupted, then the resource manager component 240 may send (428) a request to the session manager component 285 to interrupt/suspend the first skill session.

The session manager component 285 may set (430) the session status data for the first skill session as suspended, and store the session status data in the session data storage 305. The session manager component 285 may send (432) a message to the skill 290*a* indicating the first skill session is suspended. The session manager component 285 may associate (436) the use of the first resource with the second skill session by associating a resource identifier or resource type to the data record corresponding to the second skill session. The session manager component 285 may send (438) the second skill session identifier to the resource manager component 240.

The session manager component 285 may have initiated a second skill session to track the beginning and the end of the interaction between the user and the skill 290*x*. In some embodiments, the session manager component 285 may store a data record in the session data storage 305 including a second skill session identifier, a second skill identifier (e.g., a name, an alphanumeric identifier, or other kind of identifier identifying the skill 290*a*), and skill session status data. The session manager component 285 may set the skill session status data as active to indicate that the skill session corresponding to the skill 290*x* is active.

The resource manager component 240 may update (440) a data record associated with the first resource in the resource data storage 310 to indicate that the first resource is in use by the second skill session. The resource manager component 240 may associate the second skill session identifier with the data record corresponding to the first resource. The resource manager component 240 may also set the resource status as 'in use' and store other data provided in the request (from step 420). The resource manager component 240 may send (442) a response to the request to the skill 290*x*. The response may include the second skill session identifier and an indication that the requested first resource is allocated to the skill 290*x*.

In some embodiments, the session manager 285 or the resource manager component 240 may include in the message of step 432 an indication that the first skill session was suspended because the first resource was reallocated to another skill session. In response, the skill 290*a* may send a request to use another resource (different from the first resource) to continue providing an output or experience to the user, and the system(s) 120 may determine whether the skill 290*a* and the skill 290*x* may provide an output or an experience to the user at the same time. This enables the skill 290*a* to adapt or switch its output or other processing to use available resources rather than suspending or pausing its output or other processing.

FIG. 4C is a signal flow diagram illustrating how a resource is reallocated according to embodiments of the present disclosure. The skill 290*x* may send (446) an indication to the session manager component 285 that a task with respect to the second resource is completed. The session manager component 285 may set (448) the status data associated with the second skill session as terminated to indicate that the interaction with the skill 290*x* has ended. The session manager component 285 may send (452) a message to the resource manager component 240 indicating that the second skill session is terminated. The resource manager component 240 may update (454) the data record associated with the first resource to indicate that the corresponding skill session is terminated and the first resource is available for allocation.

Using the session data storage 305, the session manager component 285 may determine that the first skill session was interrupted by the second skill session, and that the first skill session can now be resumed since the second skill session has terminated. The session manager component 285 may set (456) status data for the first skill session as active. The session manager 285 may send (458) a message to the resource manager 240 indicating that the first skill session is active. The resource manager component 240 may update (460) the data record associated with the first resource to indicate that the corresponding skill session is active and that the first resource is in use by the first skill session. The resource manager component 240 may send (462) a message to the skill 290*a* indicating availability and/or allocation of the first resource to the skill 290*a*. The message may include the first skill session identifier.

FIG. 4D is a signal flow diagram illustrating how skills can use different resources at the same time according to embodiments of the present disclosure. The skill 290*x* may send (470) a request to use a second resource to the resource manager component 240. The request may indicate the resource type, a priority level for using the second resource, and a scope for using the second resource. The request may also indicate whether the second resource can be shared. In other embodiments, the resource manager component 240 may specify the priority level, the scope of use, and/or whether the second resource can be shared based on the skill 290*x* requesting the second resource and/or the type of resource requested.

The resource manager component 240 may determine (472) that there is an active skill session—the first skill session using the first resource. The resource manager component 240 may determine, using the resource data storage 310, that the first skill session is active and using the first resource. The resource manager component 240 may then determine (474) whether the first skill session and the second skill session can co-exist, that is, whether the first skill session can continue using the first resource while the second skill session uses the second resource.

The resource manager component 240 may make the determination at step 474 based on whether the first resource in use is the same as the second resource that is requested. If the data corresponding to the first skill session indicates that it can share the use of the first resource and the skill 290x indicates that it can share the resource, then the resource may be allocated to the skill 290x also. If the first resource and the second resource are different resources, then the resource manager component 240 may determine if the first and second skill sessions can co-exist based on a priority level for using the resource and/or an indication by the skill 290a whether it is able to provide an output or experience to the user while the skill 290x provides an output or experience to the user and vice-versa.

If the requested resource is in use by the first skill session that is active, then the resource manager component 240 may determine if the first skill session requested use of the resource for session scope. Then the resource manager component 240 may determine if the first skill session indicated a low priority for using the first resource. Based on these factors, the resource manager component 240 may determine if the first skill session can be interrupted. In example embodiments, the request to use a resource may include a type of resource requested, a priority level for using the resource, a scope for using the resource, and other data. The type of resource may indicate which resource the skill wants to use, for example, audio player or display.

If the resource manager component 240 determines that the first and second skill sessions cannot co-exist, then the resource manager component 240 may send (476) a message to the skill 290x denying the request to use the second resource. If the first and second skill sessions can co-exist, then the resource manager component 240 may allocate the second resource to the second skill session corresponding to the skill 290x by sending (478) a message to the session manager 285 indicating allocation of the second resource to the second skill session. The session manager component 285 may associate (480) the use of the second resource with the second skill session by associating a resource identifier or resource type to the data record corresponding to the second skill session. The session manager component 285 may send (482) the second skill session identifier to the resource manager component 240.

The session manager component 285 may have initiated a second skill session to track the beginning and the end of the interaction between the user and the skill 290x. In some embodiments, the session manager component 285 may store a data record in the session data storage 305 including a second skill session identifier, a second skill identifier (e.g., a name, an alphanumeric identifier, or other kind of identifier identifying the skill 290a), and skill session status data. The session manager component 285 may set the skill session status data as active to indicate that the skill session corresponding to the skill 290x is active.

The resource manager component 240 may update (484) a data record associated with the second resource in the resource data storage 310 to indicate that the second resource is in use by the second skill session. The resource manager component 240 may associate the second skill session identifier with the data record corresponding to the second resource. The resource manager component 240 may also set the resource status as 'in use' and store other data provided in the request (from step 470). The resource manager component 240 may send (486) a response to the request to the skill 290x. The response may include the second skill session identifier and an indication that the requested second resource is allocated to the skill 290x.

Figure 5A:
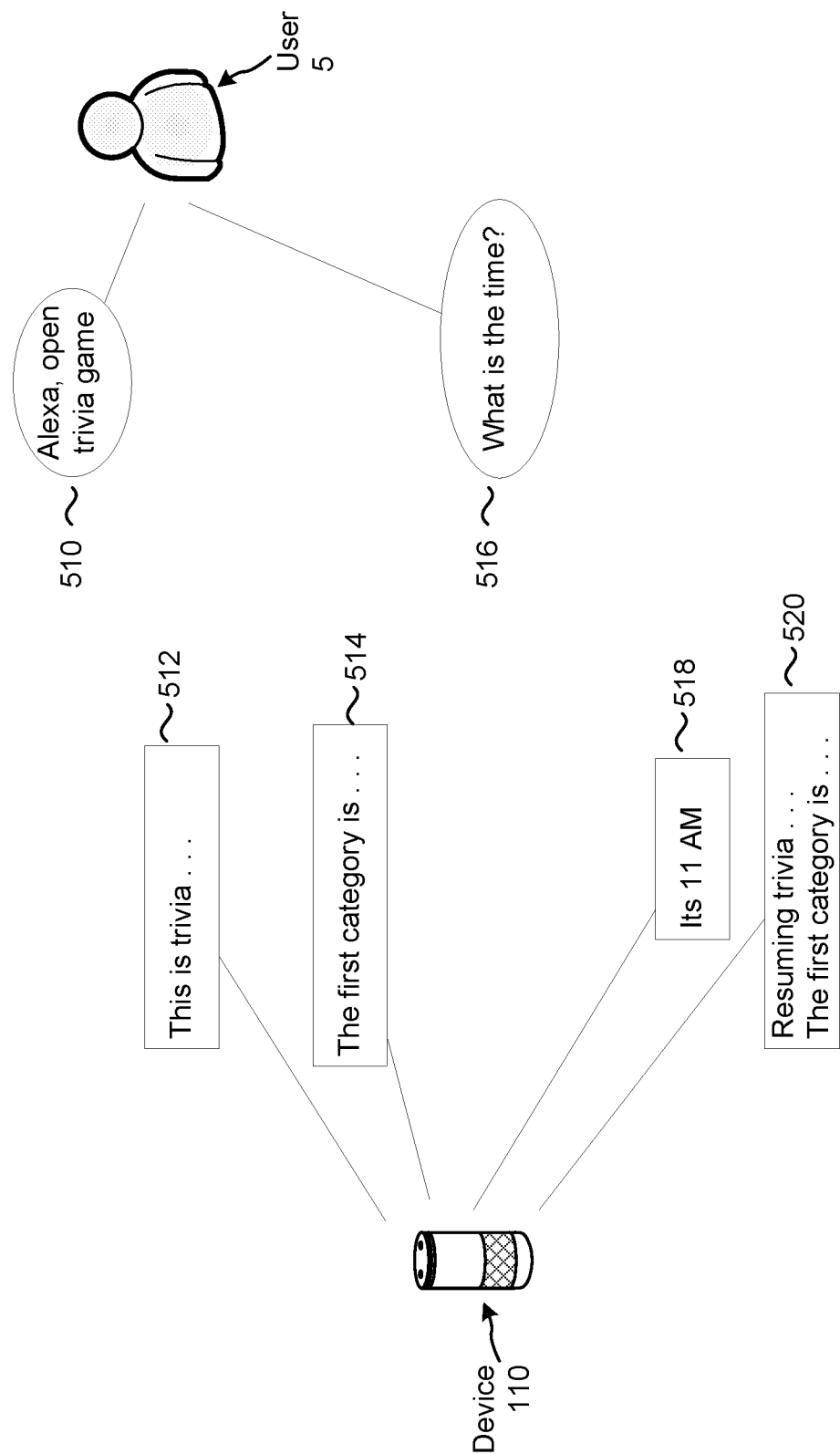

FIGS. 5A and 5B illustrate a user interaction with a system according to embodiments of the present disclosure. As illustrated in FIG. 5A, a user 5 may interact with the device 110a and say "Alexa, open trivia game" (e.g., utterance 510). The device 110a may respond "This is trivia . . . " (e.g., output audio 512) and "The first category is . . . " (e.g., output audio 514). While the current session with the trivia skill is ongoing, the user 5 may say "what is the time?" (e.g., utterance 516). The system 100 may determine that the user 5 intends to know the time requiring invocation of another skill and that the user 5 is not intending to provide an answer to a trivia question or intending to interact with the trivia skill. To respond to the user request represented in the utterance 516, a second skill may request use of a resource (e.g., speech synthesizer resource) that was previously being used by the trivia skill. As described above, the system 100 may suspend the skill session corresponding to the trivia skill, and allocate the resource to the second skill to provide an output to the user. The system 100, thus causes the device 110 to output "Its 11 AM" (e.g., output audio 518). In this example, the system 100 may determine to automatically resume the previous skill—the trivia skill, allocate the resource to the trivia skill and cause the device 110a to output "Resuming trivia. . . . The first category is . . . " (e.g., output audio 520).

As illustrated in FIG. 5B, the user 5 may interact with the device 110f that includes a display screen and say "Alexa, order a pizza" (e.g., utterance 526). The device 110f may respond "Welcome to pizza ordering. What would you like to order?" (e.g., output audio 528) and may also display "Menu" (e.g., output text 534) on the display screen, where the menu may include options for ordering a pizza. While the current session with the pizza ordering skill is ongoing, the user profile associated with the user 5 may receive a notification indicating a phone call from a contact called "Mom." The device 110f may display the notification "Call from Mom" (e.g., output visual content 536) on the display screen. As described above, the system 100 may receive a request from another skill to use the display resource that is in use by the pizza ordering skill. The system 100 may determine, based on stored data, that the display resource can be shared, and enable the device 110f to output the notification 536.

Figure 6:
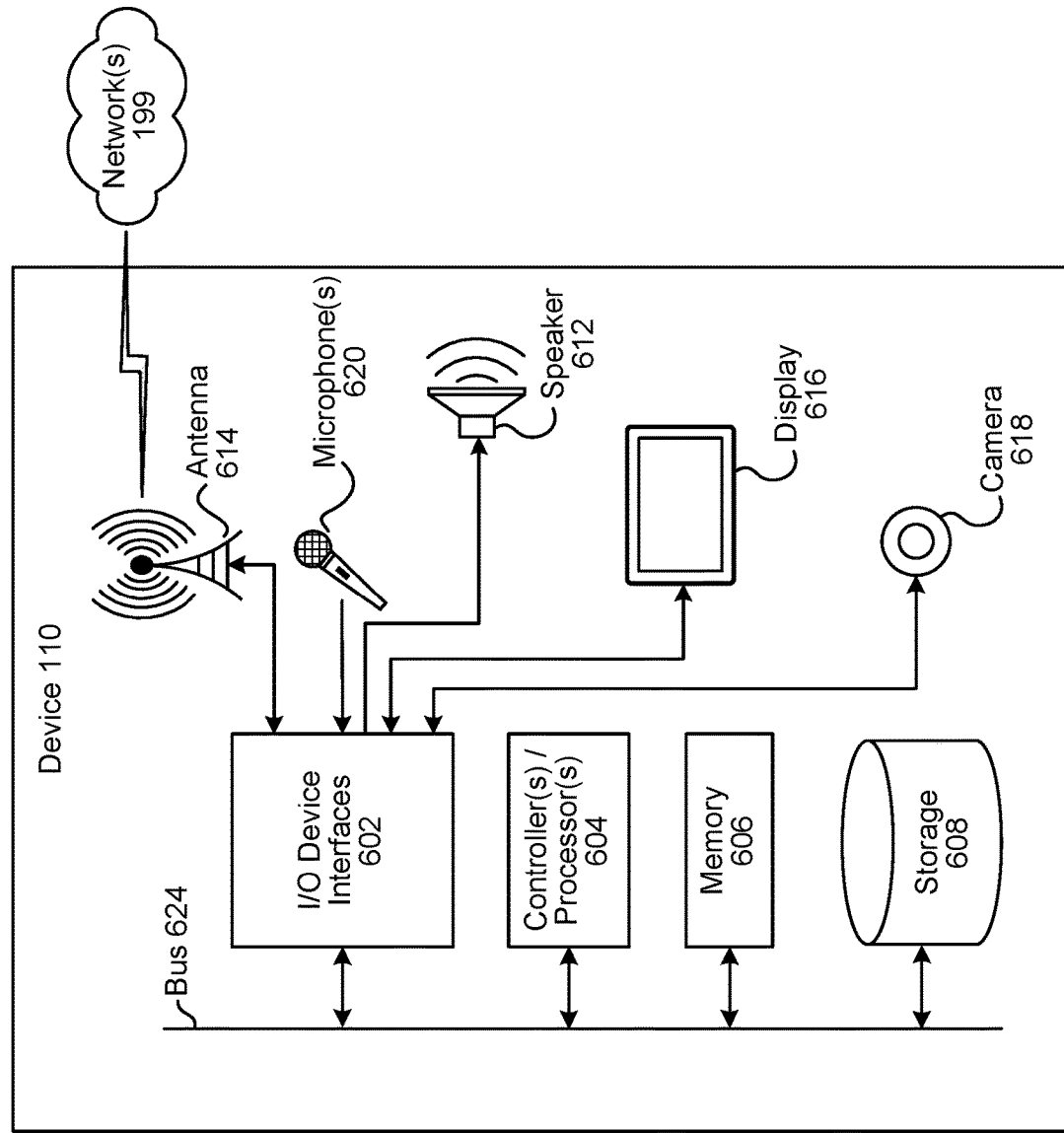
FIG. 6 is a block diagram conceptually illustrating example components of a device according to embodiments of the present disclosure.
Figure 7:
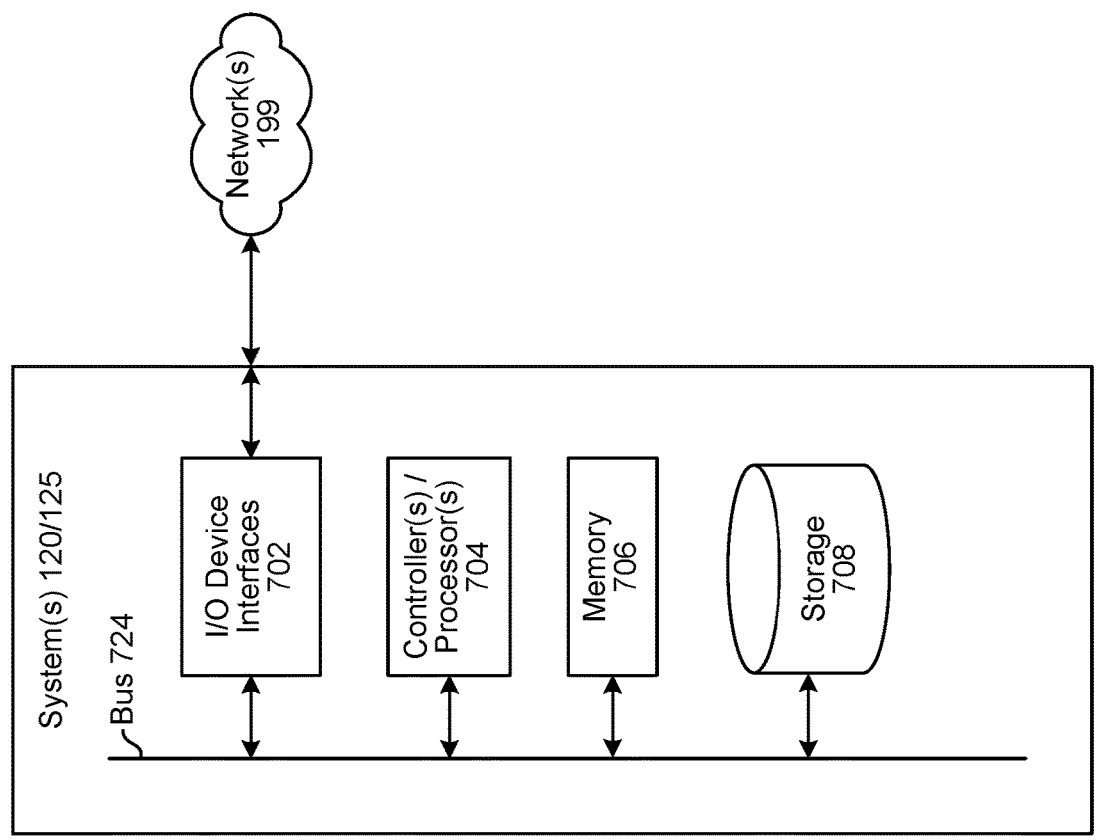
FIG. 7 is a block diagram conceptually illustrating example components of a server according to embodiments of the present disclosure.

FIG. 6 is a block diagram conceptually illustrating a device 110 that may be used with the system. FIG. 7 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (602/702), processor(s) (604/704), memory (606/706), and/or storage (608/708) of the device(s) 110 system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 8:
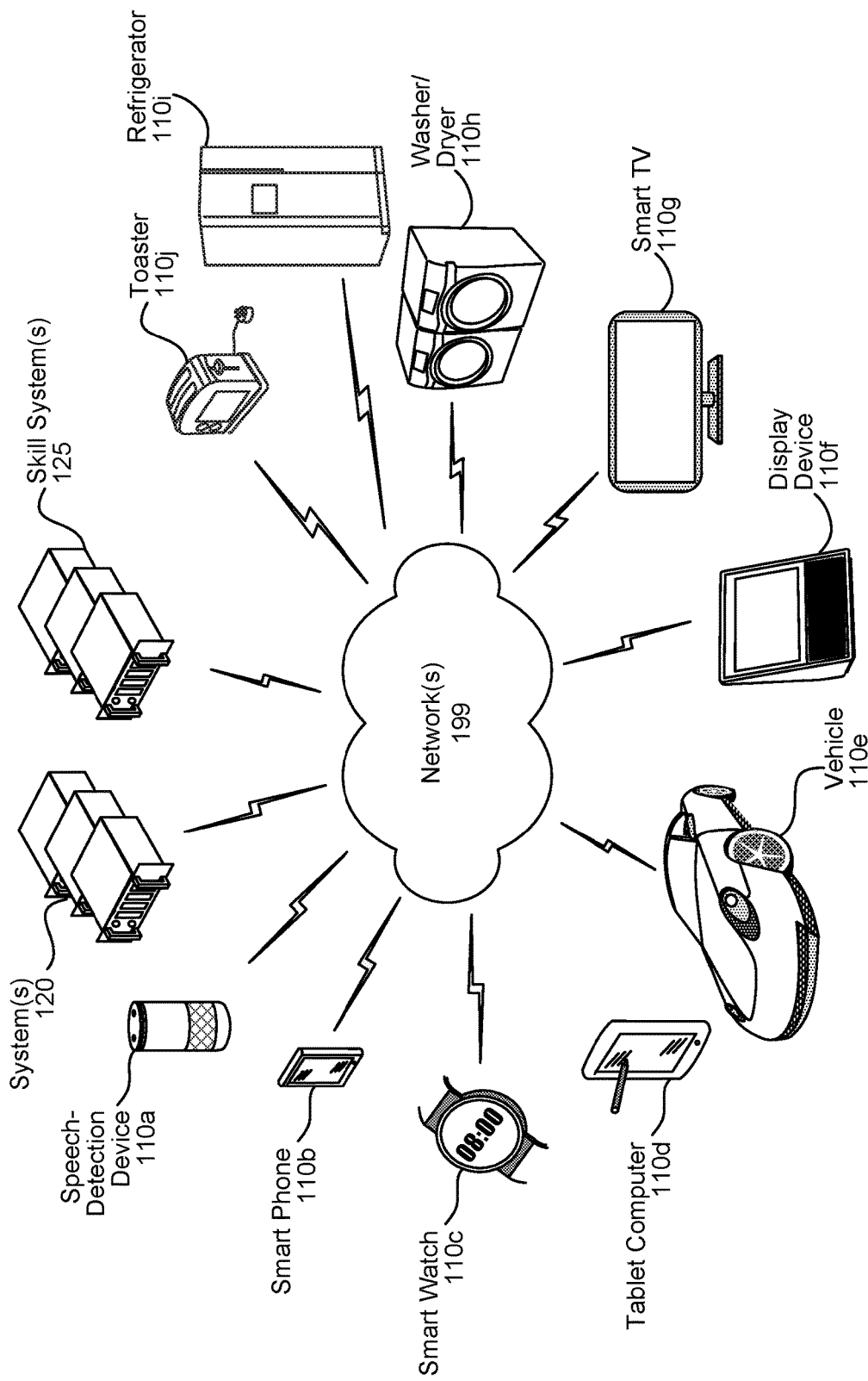
FIG. 8 illustrates an example of a computer network for use with the speech processing system.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
    receiving audio data representing an utterance associated with a user profile;
    performing speech processing using the audio data to determine an intent represented by the utterance;
    determining a first skill to execute the intent;
    initiating a first skill session corresponding to the user profile;
    sending, to a first component associated with the first skill, the intent and an command to execute the intent;
    receiving, from the first component, a first request to use an audio output component of a device associated with the user profile;
    sending, to the first component, a first message indicating allocation of the audio output component to the first skill session;
    storing a first indication that the first skill session is using the audio output component;
    receiving, from a second component associated with a second skill, a second request to use the audio output component;
    determining, using at least the first indication, that the first skill session is active with respect to the user profile and using the audio output component;
    associating second status data with the first skill session, the second status data indicating that the first skill session is suspended;
    sending, to the first component, a second message indicating the first skill session is suspended;
    receiving, from the second component, a third message indicating completion of a task with respect to the audio output component;
    associating third status data with a second skill session associated with the second skill indicating that the second skill session is terminated;
    associating fourth status data with the first skill session indicating that the first skill session is active; and
    sending, to the first component, a fourth message indicating allocation of the audio output component to the first skill session and that the first skill session is active.

2. The computer implemented method of claim 1, further comprising:
    receiving priority data indicating a priority level for using the audio output component, and;
    determining that use of the audio output component by the first skill session is capable of being interrupted based at least in part on the priority level being low; and
    determining to suspend the first skill session to allocate the audio output component to the second skill session.

3. The computer implemented method of claim 1, further comprising:
    receiving scope data indicating a type of use of the audio output component;
    determining that the type of use of the audio output component by the first skill session is intermittent; and
    determining to suspend the first skill session to allocate the audio output component to the second skill session.

4. The computer implemented method of claim 1, further comprising:
    receiving from a third component associated with a third skill, a third request to use a display component;
    determining that the first skill session is active and using the audio output component;

determining, using stored data, that the display component is capable of being used by the third skill while the audio output component is in use by the first skill;
storing a second indication that a third skill session corresponding to the third skill is using the display component; and
sending, to the third component, a third message indicating allocation of the display component to the third skill session.

5. A method comprising:
receiving, from a first component associated with a first skill, a request to use a first resource of a device with respect to a user profile;
determining that a first skill session corresponding to a second skill is using a second resource of the device with respect to the user profile;
sending, to a second component associated with the second skill, a first message indicating that the first skill session is suspended;
storing a first indication that a second skill session corresponding to the first skill is using the first resource;
sending, to the first component, a second message indicating allocation of the first resource to the second skill session;
receiving, from the first component, a second indication of completion of a task with respect to the first resource; and
sending, to the second component associated with the second skill, a third message indicating resumption of the first skill session and allocation of the second resource to the first skill session.

6. The method of claim 5, further comprising prior to receiving the request to use the first resource:
initiating the first skill session corresponding to the second skill;
receiving, from the second component, a second request to use the second resource; and
storing a third indication that the second resource is in use with respect to the first skill session.

7. The method of claim 5, further comprising:
determining that the first resource requested by the first skill is the same as the second resource in use with respect to the first skill session;
determining that a first priority level for using the second resource is low compared to a second priority level for using the first resource; and
determining to allocate the first resource to the second skill based at least in part on the first priority level.

8. The method of claim 5, further comprising:
receiving, from a third component associated with a third skill, a third request to use the second resource, the third request including a first priority level for using the second resource;
determining that a second priority level for use of the second resource by the first skill is higher than the first priority level; and
sending, to the third component, a fourth message denying the third request, the fourth message being generated based at least in part on the second priority level and the first skill session being active.

9. The method of claim 5, further comprising:
determining that use of the second resource with respect to the first skill session is capable of being interrupted based at least in part on the second resource being used to provide non-continuous output via the device.

10. The method of claim 5, further comprising:
receiving from a third component associated with a third skill, a second request to use the second resource;
determining that the first skill session is using the second resource;
determining, using stored data, that a first output corresponding to the third skill is capable of being presented in conjunction with a second output corresponding to the second skill; and
sending, to the third component and the second component, a third message indicating allocation of the second resource with respect to a third skill session corresponding to the third skill.

11. The method of claim 5, further comprising:
receiving audio data representing a utterance, the utterance associated with a user profile;
performing speech processing using the audio data to determine an intent represented by the utterance;
determining the first skill to execute the intent;
initiating the second skill session; and
sending, to the first component, the intent and an instruction to execute the intent,
wherein the request to use the first resource is sent in response to the instruction to execute the intent.

12. The method of claim 5, further comprising:
receiving from a third component associated with a third skill, a second request to use a third resource;
determining that the first skill session is using the second resource;
determining, using stored data, that the second resource is capable of being used while the third resource is in use;
storing a second indication that a third skill session corresponding to the third skill is using the third resource; and
sending, to the third component, a third message indicating allocation of the third resource with respect to the third skill session.

13. A system comprising:
at least one processor; and
at least one memory including instructions that, when executed by the at least one processor, cause the system to:
receive, from a first component associated with a first skill, a request to use a first resource of a device with respect to a user profile;
determine that a first skill session corresponding to a second skill is using a second resource of the device with respect to the user profile;
send, to a second component associated with the second skill, a first message indicating that the first skill session is suspended;
store a first indication that a second skill session corresponding to the first skill is using the first resource;
send, to the first component, a second message indicating allocation of the first resource to the second skill session;
receive, from the first component, a second indication of completion of a task with respect to the first resource; and
send, to the second component associated with the second skill, a third message indicating resumption of the first skill session and allocation of the second resource to the first skill session.

14. The system of claim 13, wherein the instructions that, when executed by the at least one processor, further cause the system to:

initiate the first skill session corresponding to the second skill;

receive, from the second component, a second request to use the second resource; and store a third indication that the second resource is in use with respect to the first skill session.

15. The system of claim 13, wherein the instructions that, when executed by the at least one processor, cause the system to:

determine that the first resource requested by the first skill is the same as the second resource in use with respect to the first skill session;

determine that a first priority level for using the second resource is low compared to a second priority level for using the first resource; and determine to allocate the first resource to the second skill based at least in part on the first priority level.

16. The system of claim 13, wherein the instructions that, when executed by the at least one processor, cause the system to:

receive, from a third component associated with a third skill, a third request to use the second resource, the third request including a first priority level for using the second resource;

determine that a second priority level for use of the second resource by the first skill is higher than the first priority level; and send, to the third component, a fourth message denying the third request, the fourth message being generated based at least in part on the second priority level and the first skill session being active.

17. The system of claim 13, wherein the instructions that, when executed by the at least one processor, further cause the system to:

determine that use of the second resource with respect to the first skill session capable of being interrupted based at least in part on the second resource being used to provide non-continuous output via the device.

18. The system of claim 13, wherein the instructions that, when executed by the at least one processor, further cause the system to:

receive from a third component associated with a third skill, a second request to use the second resource;

determine that the first skill session is using the second resource;

determine, using stored data, that a first output corresponding to the third skill is capable of being presented in conjunction with a second output corresponding to the second skill; and send, to the third component, a third message indicating allocation of the second resource with respect to a third skill session corresponding to the third skill.

19. The system of claim 13, wherein the instructions that, when executed by the at least one processor, further cause the system to:

receive audio data representing a utterance, the utterance associated with a user profile;

perform speech processing using the audio data to determine an intent represented by the utterance;

determine the first skill to execute the intent;

initiate the second skill session; and send, to the first component, the intent and an instruction to execute the intent, wherein the request to use the first resource is sent in response to the instruction to execute the intent.

20. The system of claim 13, wherein the instructions that, when executed by the at least one processor, further cause the system to:

receive from a third component associated with a third skill, a second request to use a third resource;

determine that the first skill session is using the second resource;

determine, using stored data, that the second resource is capable of being used while the third resource is in use;

store a second indication that a third skill session corresponding to the third skill is using the third resource; and send, to the third component, a third message indicating allocation of the third resource with respect to the third skill session.

* * * * *